(12) United States Patent
Mitchell

(10) Patent No.: US 10,851,582 B1
(45) Date of Patent: Dec. 1, 2020

(54) DOOR PANEL STILE AND RAIL CONNECTOR SYSTEM, APPARATUS AND METHODS

(71) Applicant: Endura Products, Inc., Colfax, NC (US)

(72) Inventor: Michael K. Mitchell, Winston-Salem, NC (US)

(73) Assignee: Endura Products, LLC, Colfax, NC (US)

( * ) Notice: Subject to any disclaimer, the term of this patent is extended or adjusted under 35 U.S.C. 154(b) by 0 days.

(21) Appl. No.: 16/534,596

(22) Filed: Aug. 7, 2019

Related U.S. Application Data

(60) Provisional application No. 62/715,993, filed on Aug. 8, 2018.

(51) Int. Cl.
*E06B 3/968* (2006.01)
*F16B 12/44* (2006.01)

(52) U.S. Cl.
CPC .............. *E06B 3/968* (2013.01); *F16B 12/44* (2013.01)

(58) Field of Classification Search
CPC ........ F16B 12/125; F16B 12/22; F16B 12/24; F16B 12/44; E06B 3/968
USPC ....... 403/230, 292, 294, 297, 298, 402, 314, 403/345; 52/272, 281, 282.4
See application file for complete search history.

(56) References Cited

U.S. PATENT DOCUMENTS

| | | | |
|---|---|---|---|
| 3,375,030 A * | 3/1968 | Thompson | B62D 33/044 403/231 |
| 3,502,359 A * | 3/1970 | Lucci | F16B 12/04 403/267 |
| 3,674,068 A * | 7/1972 | Lucci | B27F 1/00 144/346 |
| 4,045,927 A * | 9/1977 | Diaz | E04B 1/6162 52/127.11 |
| 4,116,573 A * | 9/1978 | Fuchs | F16B 5/0088 403/264 |
| 4,373,829 A * | 2/1983 | Braxell | F16B 12/04 403/266 |
| 4,405,253 A * | 9/1983 | Stockum | F16B 12/2027 108/158 |
| 4,557,467 A * | 12/1985 | Lin | E04F 11/1836 256/1 |
| 4,870,797 A * | 10/1989 | Hagemeyer | E06B 3/7005 52/455 |
| 5,095,830 A * | 3/1992 | Love | B31F 1/08 101/28 |
| 5,261,203 A * | 11/1993 | Yoon | E06B 3/984 52/455 |
| 5,363,625 A * | 11/1994 | Philippi | E04B 1/5831 52/653.2 |
| 5,741,083 A * | 4/1998 | Schvartz | E04B 1/2604 403/297 |
| 5,775,041 A * | 7/1998 | Tull | E06B 3/10 403/231 |
| 5,778,598 A * | 7/1998 | Ohanesian | E06B 7/086 49/74.1 |
| 6,185,894 B1 * | 2/2001 | Sisco | E06B 3/725 52/455 |
| 6,503,020 B1 * | 1/2003 | Mascioletti | E04B 1/2604 403/231 |

(Continued)

FOREIGN PATENT DOCUMENTS

JP 2018109440 A * 7/2018 ............ F16B 11/006

*Primary Examiner* — Brent W Herring
(74) *Attorney, Agent, or Firm* — MacCord Mason PLLC

(57) ABSTRACT

A system, device, assembly and methods for a door assembly, including a door stile and rail connector are shown and described.

16 Claims, 19 Drawing Sheets

(56) References Cited

U.S. PATENT DOCUMENTS

| | | | | |
|---|---|---|---|---|
| 7,264,416 B2* | 9/2007 | Kahl | ............... | F16B 7/18 211/182 |
| 7,571,574 B2* | 8/2009 | Yu | ............... | E06B 3/9632 312/265.1 |
| 7,698,871 B2* | 4/2010 | Mansueto | ............ | E06B 3/9681 52/656.9 |
| 7,784,239 B2* | 8/2010 | Mansueto | ............ | E06B 3/9681 52/656.9 |
| 7,845,139 B1* | 12/2010 | Mansueto | ............ | E06B 3/9642 52/745.15 |
| 8,490,347 B2* | 7/2013 | Valler | ............... | E06B 3/16 52/204.1 |
| 8,528,188 B2* | 9/2013 | Vestergaard-Jensen | ............ | F16B 12/18 29/525.01 |
| 8,984,821 B2* | 3/2015 | Bruno | ............... | E06B 3/984 52/210 |
| 8,992,114 B2* | 3/2015 | Ajanovic | ............ | F16B 12/2063 403/362 |
| 9,810,253 B2* | 11/2017 | Koelling | ............ | F16B 12/26 |
| 10,197,081 B2* | 2/2019 | Koelling | ............ | A47F 5/10 |
| 10,280,960 B2* | 5/2019 | Giovannetti | ............ | F16B 12/54 |
| 10,443,635 B2* | 10/2019 | Cuddy | ............ | F16B 12/2009 |
| 2003/0123928 A1* | 7/2003 | Perich | ............ | E05B 65/0876 403/402 |
| 2005/0008430 A1* | 1/2005 | Kahl | ............... | F16B 7/18 403/231 |
| 2009/0003928 A1* | 1/2009 | Ohrstrom | ............ | E06B 3/9647 403/205 |
| 2012/0279166 A1* | 11/2012 | Valler | ............ | E06B 3/9646 52/656.2 |
| 2017/0037891 A1* | 2/2017 | Giovannetti | ............ | F16B 12/2027 |
| 2018/0106282 A1* | 4/2018 | Cuddy | ............ | F16B 5/01 |

* cited by examiner

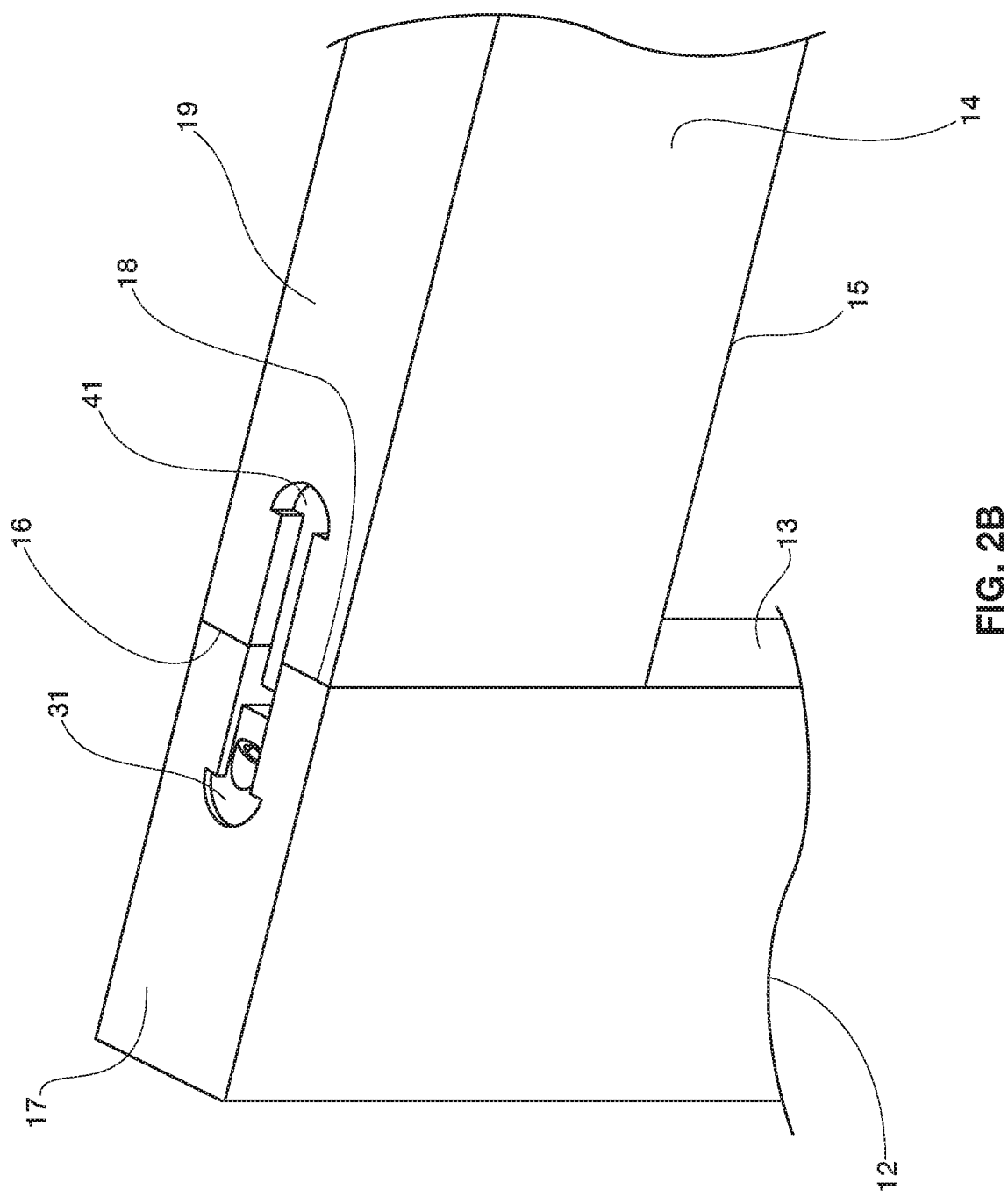

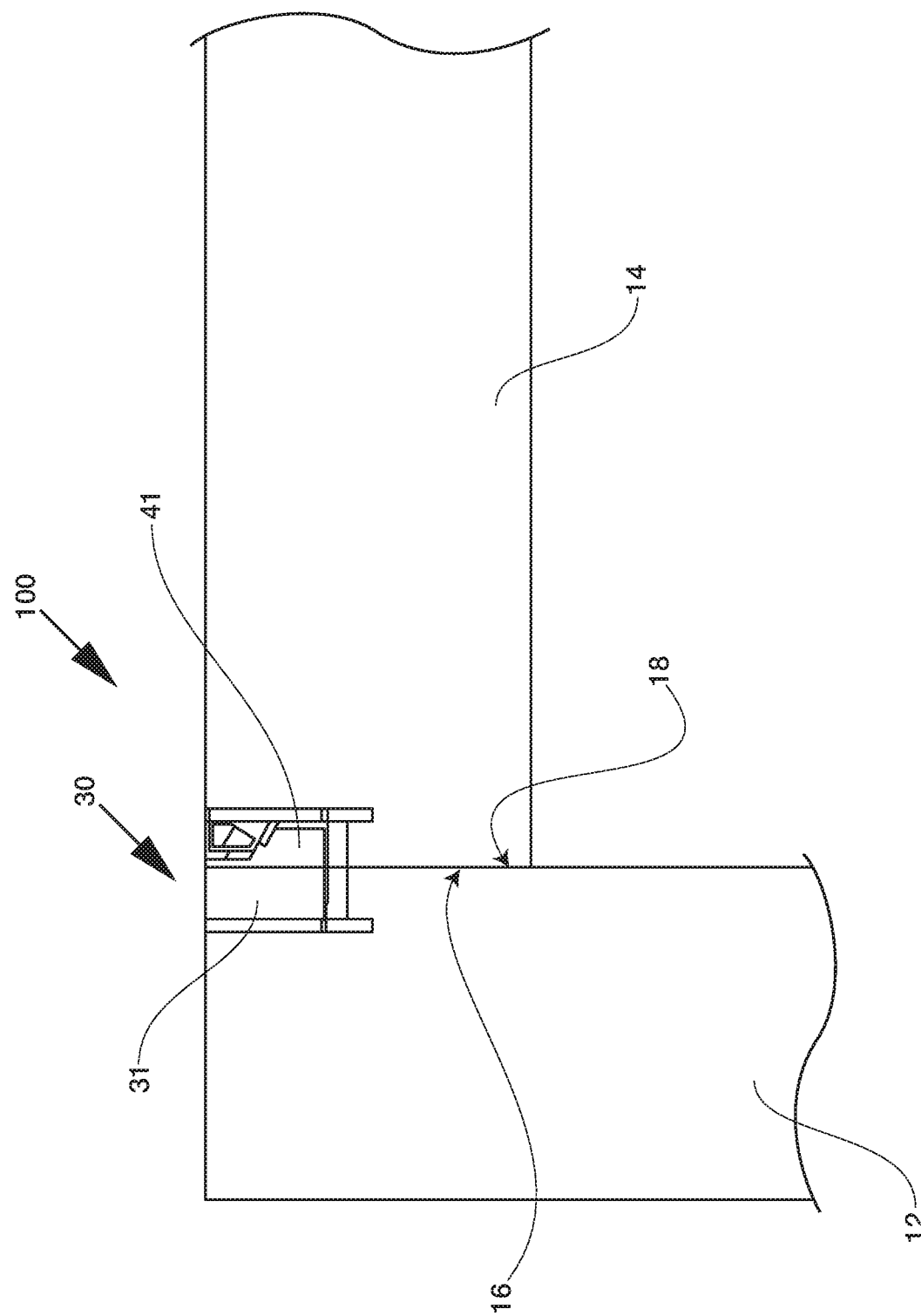

DOOR PANEL STILE AND RAIL CONNECTOR SYSTEM, APPARATUS AND METHODS

FIELD OF TECHNOLOGY

The present disclosure relates generally to doors and door panels for entranceways for example, for a building and, more particularly, to door panel stile and rail connector system, apparatus, and/or methods for a door assembly for a residence/facility.

BACKGROUND

Many exterior door panel construction methods start with fabrication of a frame. This frame is typically made by joining vertical stile members on each side to horizontal rail members in between the stiles at the top and bottom. Typical joinery of the rail stile may include the use of nails, staples, screws, and adhesive. Interface surfaces are usually butt jointed. Once the frame is assembled, door skins (made often of steel or fiberglass) are attached to the frame either by crimping and/or adhesive. Insulating foam is typically utilized, either by inserting within the frame space prior to skin attachment, or by injecting through a passage in the bottom rail once skins are secured.

These conventional joints between the door panel stile and rails, can be subject to instability over time and often ill fitted to sustain repeated opening and shutting, weathering and settling of the facility.

Thus, the Applicant recognized there remains a need for a new and improved connector for joining door panel stiles and rails for door assemblies, and it is to these and other challenges that the inventions of the present disclosure are directed.

SUMMARY

The present disclosure is directed in one embodiment to a door rail and stile assembly for a door panel. The assembly may include a door stile member for a door panel, a door rail member for a door panel, a joint formed by the stile member and the rail member along a stile mating surface and a rail mating surface, and an adjustable connector having a rail connector portion and a stile connector portion. In some examples, the connector body is embedded in the rail member and the stile member. The stile connector portion and the rail connector portion may interface to form a connector adjustment face.

The assembly may include a stile interlock and/or a rail interlock. The assembly may include a stile connector projection. The projection may be a diagonal extension. The projection may house an anchor. The anchor may mate with a securing base.

The connector adjustment face may provide surfaces that slide against each other so the connector is configured to be an adjustable connector that allows an adjustability in the door panel joint to accommodate temperature, stress and settling that occurs. The connector adjustment face may be a tapered face. The connector adjustment face may be a stepped face. The connector adjustment face may be an angled face. There may be an angle alpha that is greater than ninety degrees formed between the stile connector and the stile connector projection.

The connector may include a clamp and clamp spacer configuration, so that the clamp bridges the space between the stile connector portion and the rail connector portion.

The stile connector portion may include a slide. The rail connector portion may include a slide. The slide may be individually adjustable with each connector portion. The connector, in this embodiment, may have dual points of adjustability, and/or work together to form an adjustable connector system. The connector may include an adjustment space in the portions. The adjustable space may include a tapered edge wall. The adjustable space may include an angled edge wall. The slide may move along and be guided by the angled edge wall. The angled edge wall may take on a non-vertical orientation.

In some embodiments the invention may be considered a connector for a door panel according to any of the embodiments disclosed herein. The invention may also be considered a kit for adjusting a door panel joint according to any of the embodiments herein.

Other embodiments may include methods for securing a doorway panel joint by way of any of the embodiments disclosed herein. The inventions may also include methods for adjustment of a doorway panel joint by way of any of the embodiments disclosed herein.

Still other examples of the inventions may include a system for securing a doorway panel joint by way of any of the embodiments disclosed herein.

These and other aspects of the inventions of the present disclosure will become apparent to those skilled in the art after a reading of the following description of embodiments when considered with the drawings.

BRIEF DESCRIPTION OF THE DRAWINGS

FIG. 2B is a top perspective view of one example of the connector for a door rail and stile assembly of FIG. 2A;

FIG. 3A is a front view of another embodiment of a connector for a door rail and stile assembly for a door panel constructed according to the present disclosure;

DESCRIPTION OF EMBODIMENTS

Figure 1:
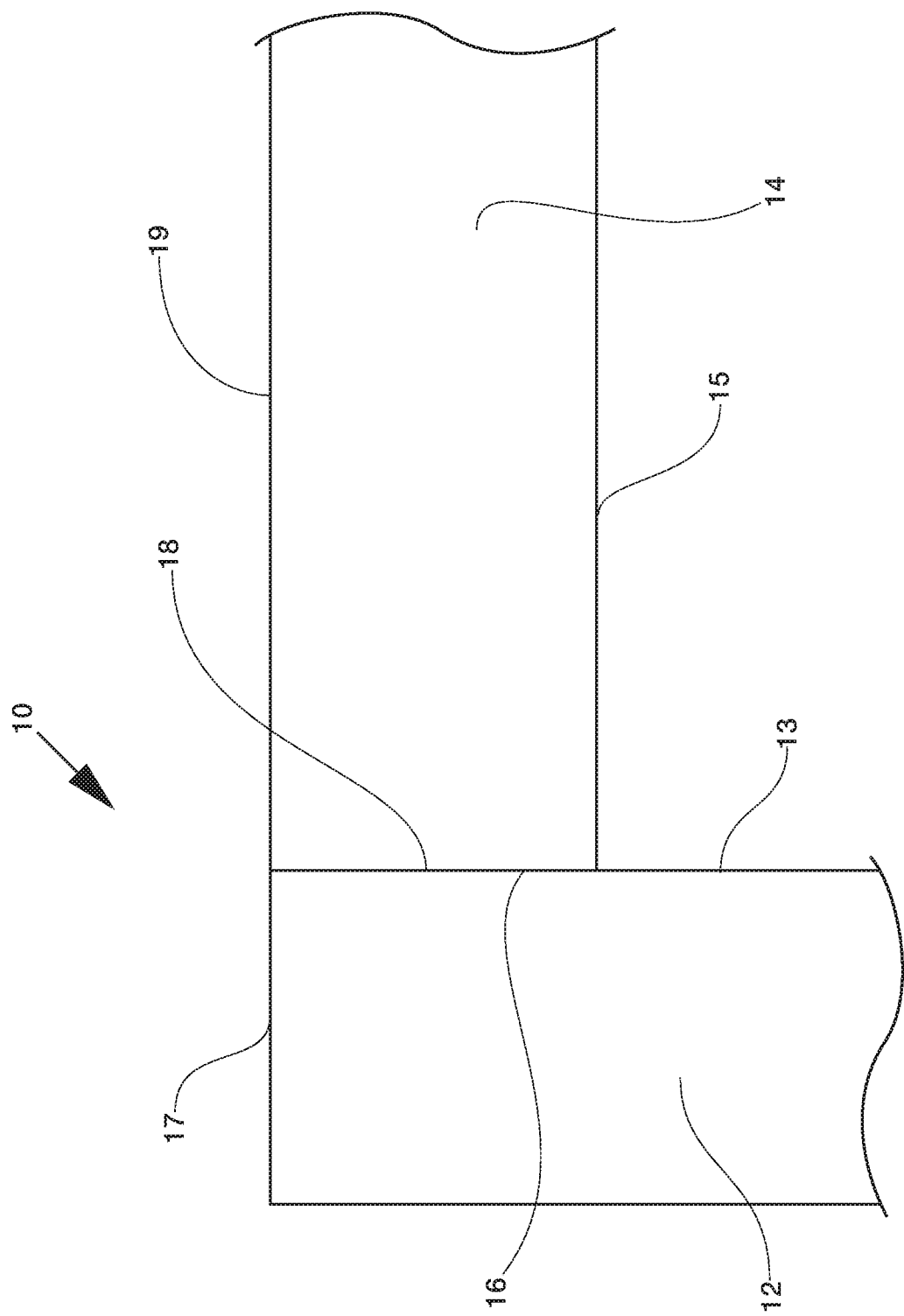
FIG. 1 is a front view of one embodiment of a door rail and stile assembly for a door panel constructed according to the present disclosure.

In the following description, like reference characters designate like or corresponding parts throughout the several views. Also in the following description, it is to be understood that such terms as "forward," "rearward," "left," "right," "upwardly," "downwardly," and the like are words of convenience and are not to be construed as limiting terms.

Referring now to the drawings in general, it will be understood that the illustrations are for the purpose of describing a preferred embodiment of the inventions and are not intended to limit the inventions thereto. FIG. 1 shows, in one embodiment, a door rail and stile assembly 10 for a door panel. A door panel often includes vertical stile members on each horizontal side of rail members, the stile members extending between the rail members at the top and the bottom. A joint is formed between the stile member 12 and the rail member 14. It is desirable for the any connection between the stile members 12 and rail members 14 to not interfere with the aesthetics of the door panel assembly and also for the joint between the stile members 12 and the rail members 14 to be sturdy, while remaining well fitted. Often, being sturdy, aligned, and well-fitted can be contradicting variables in door panels, especially in doors with non-adjustable connections.

Figure 2A:
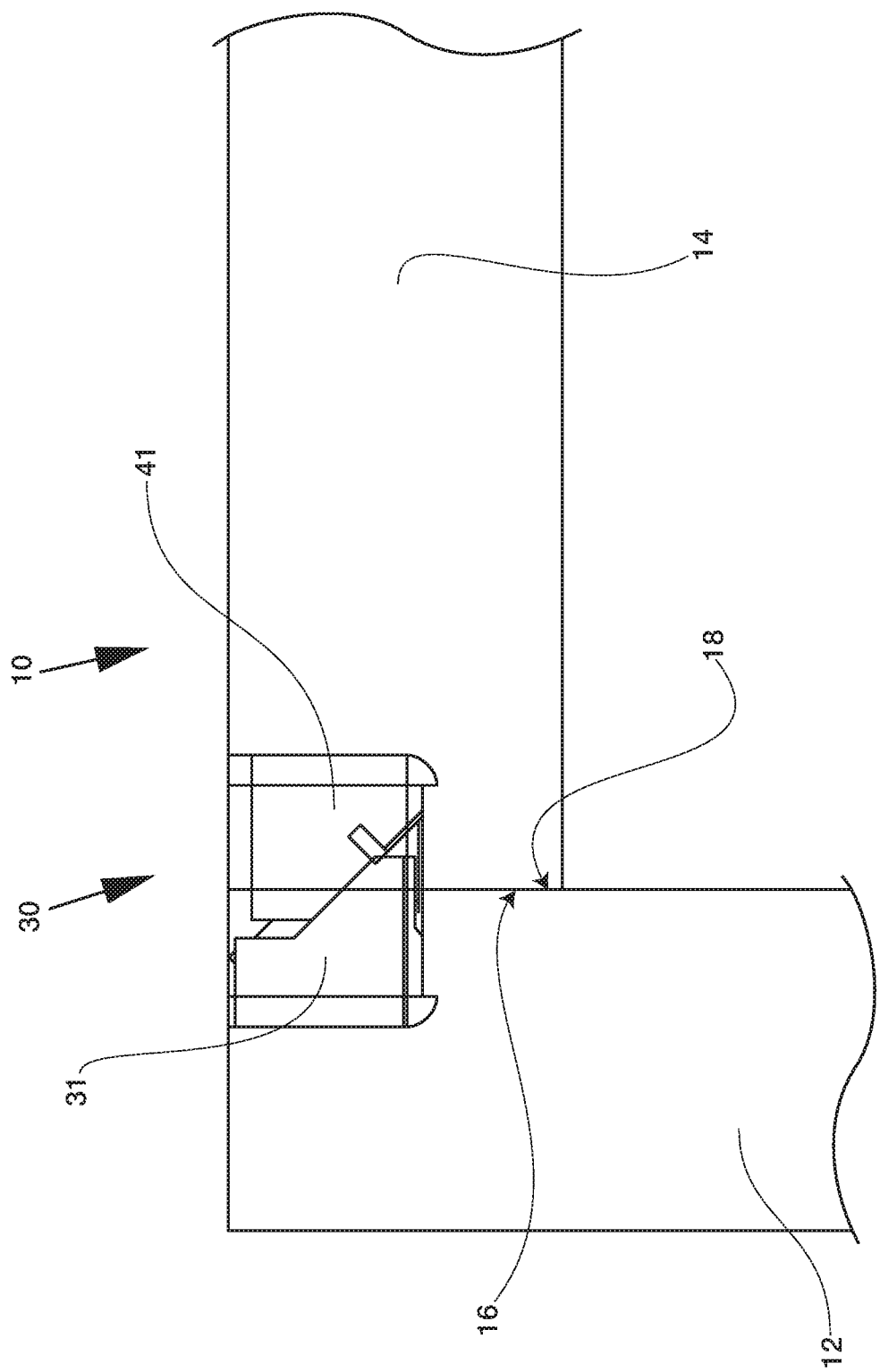
FIG. 2A is a front view with a cut away of one embodiment of a connector for a door rail and stile assembly constructed according to the present disclosure.
Figure 2C:
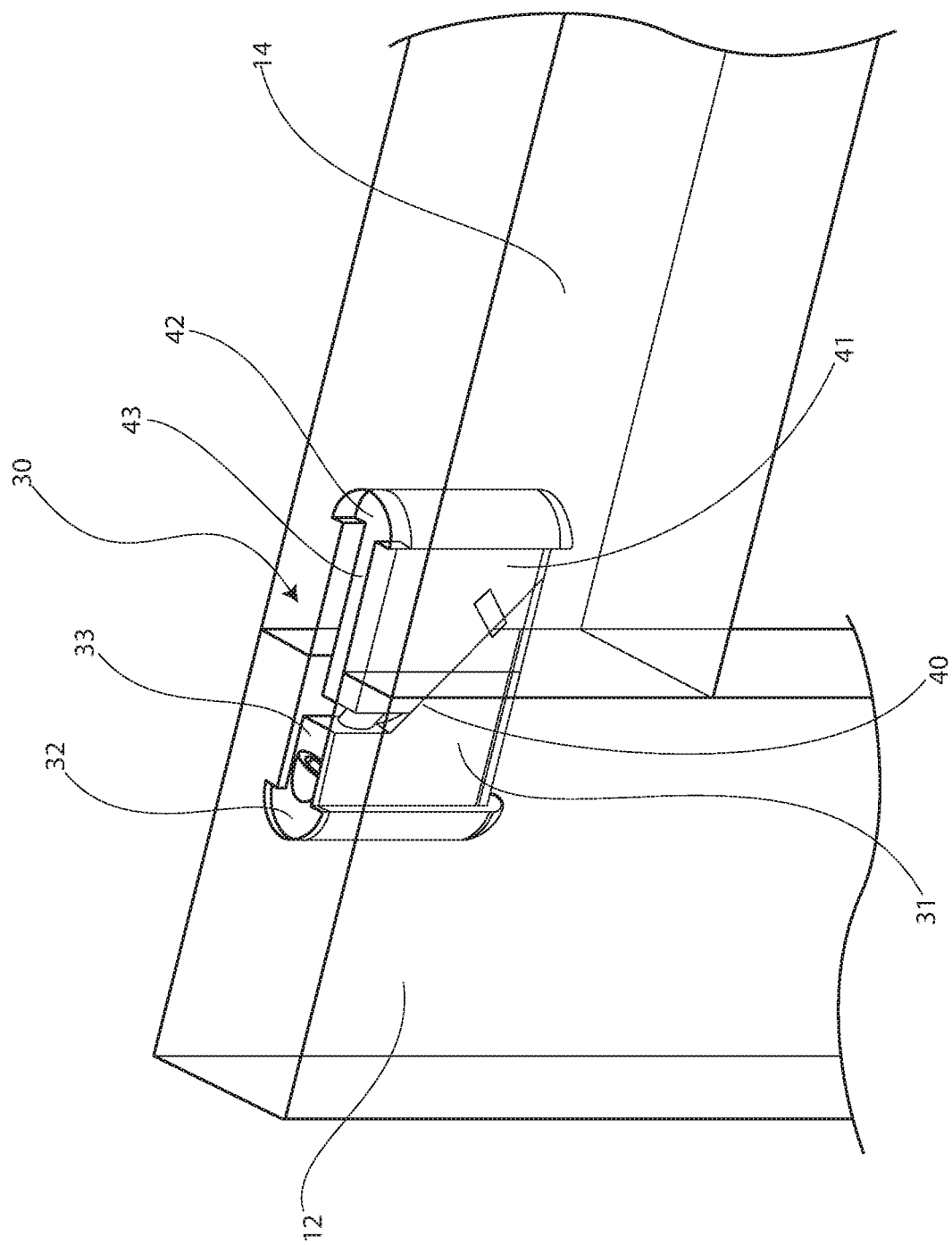
FIG. 2C shows top perspective view with a cut away showing one example of the connector for a door rail and stile assembly of FIG. 2B.
Figure 2D:
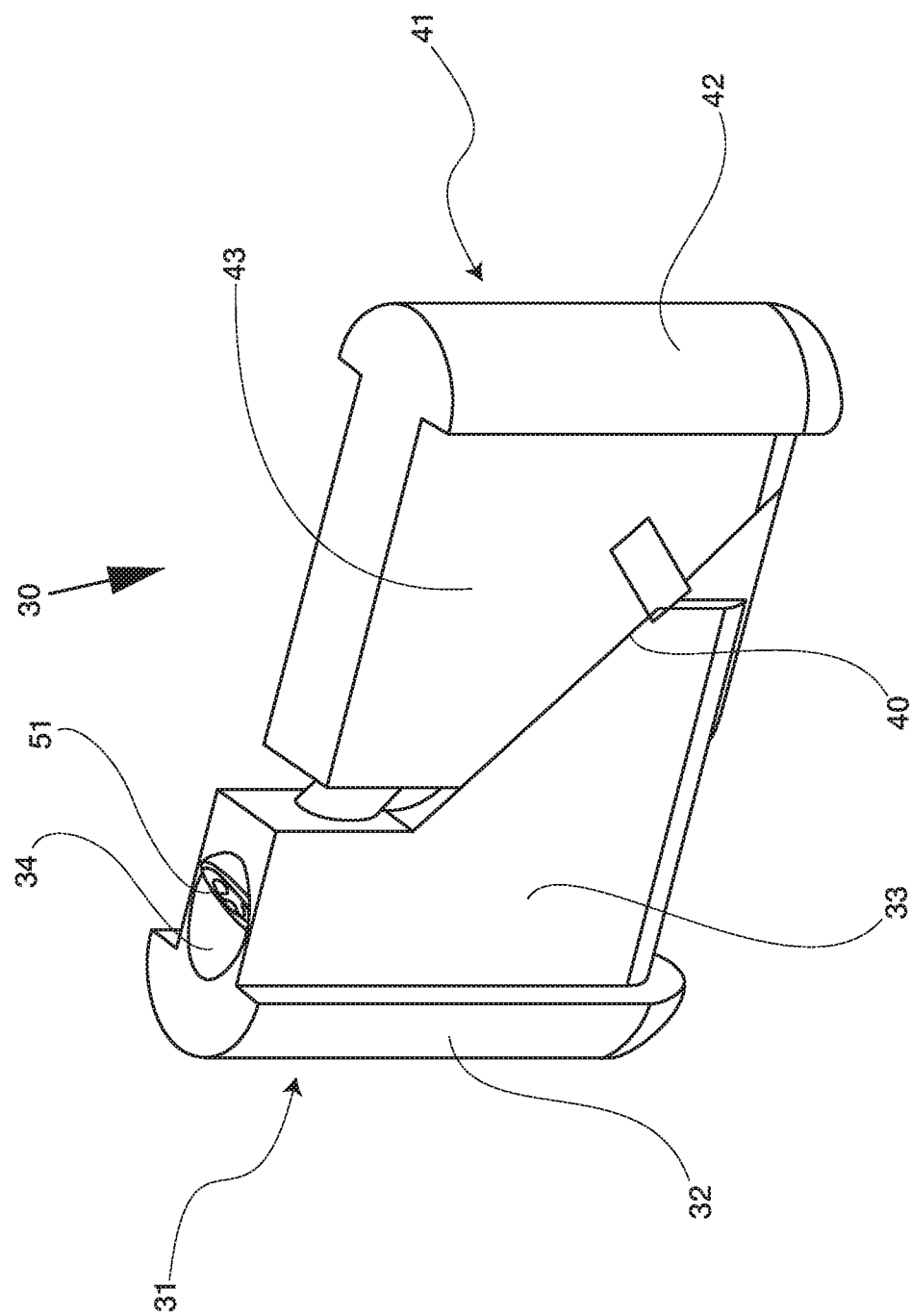
FIG. 2D shows one example of a connector for a door rail and stile assembly for a door panel constructed according to the present disclosure.
Figure 2E:
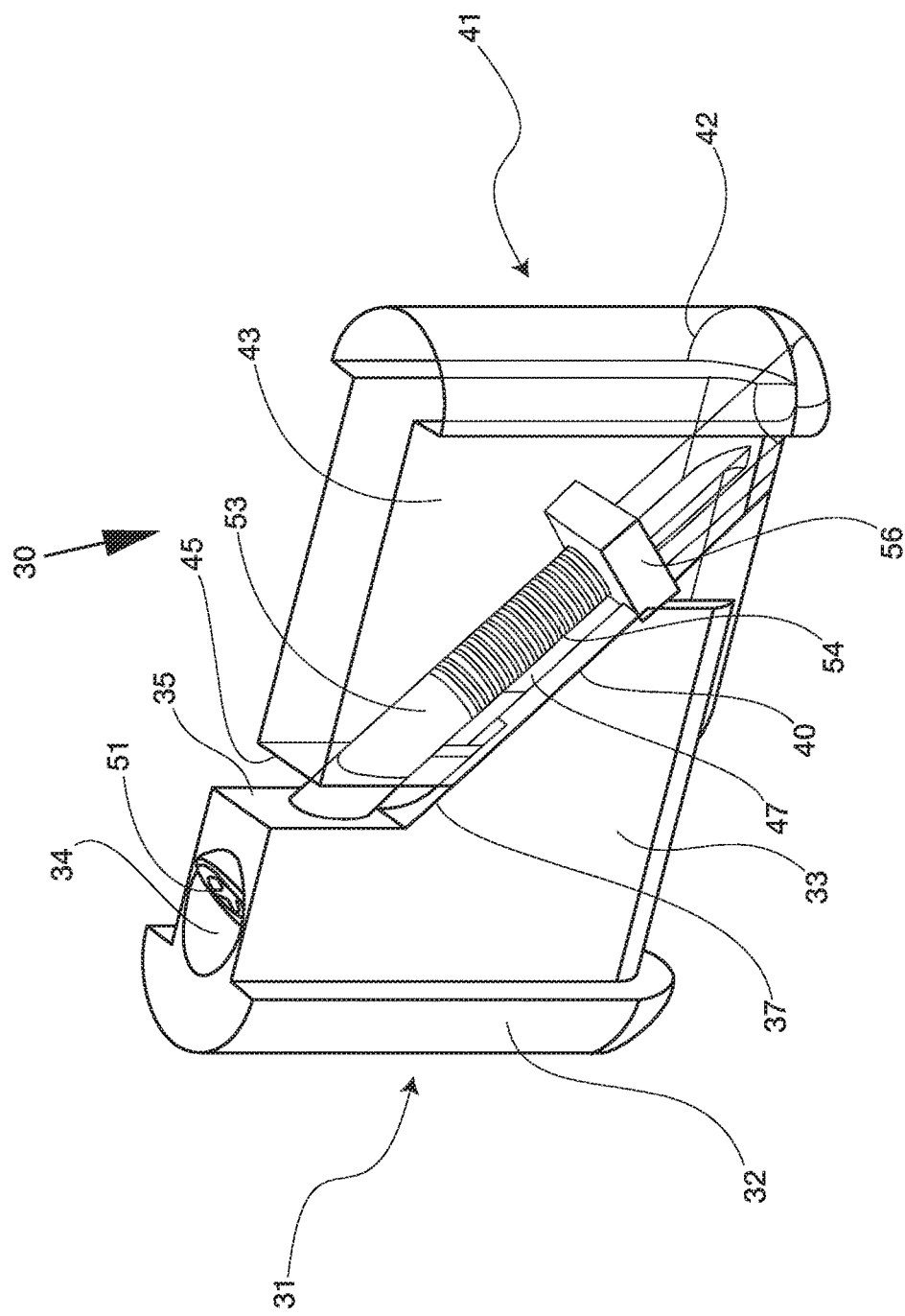
FIG. 2E shows one example of a top perspective cut away view of the connector for a door rail and stile assembly of FIG. 2D.
Figure 3B:
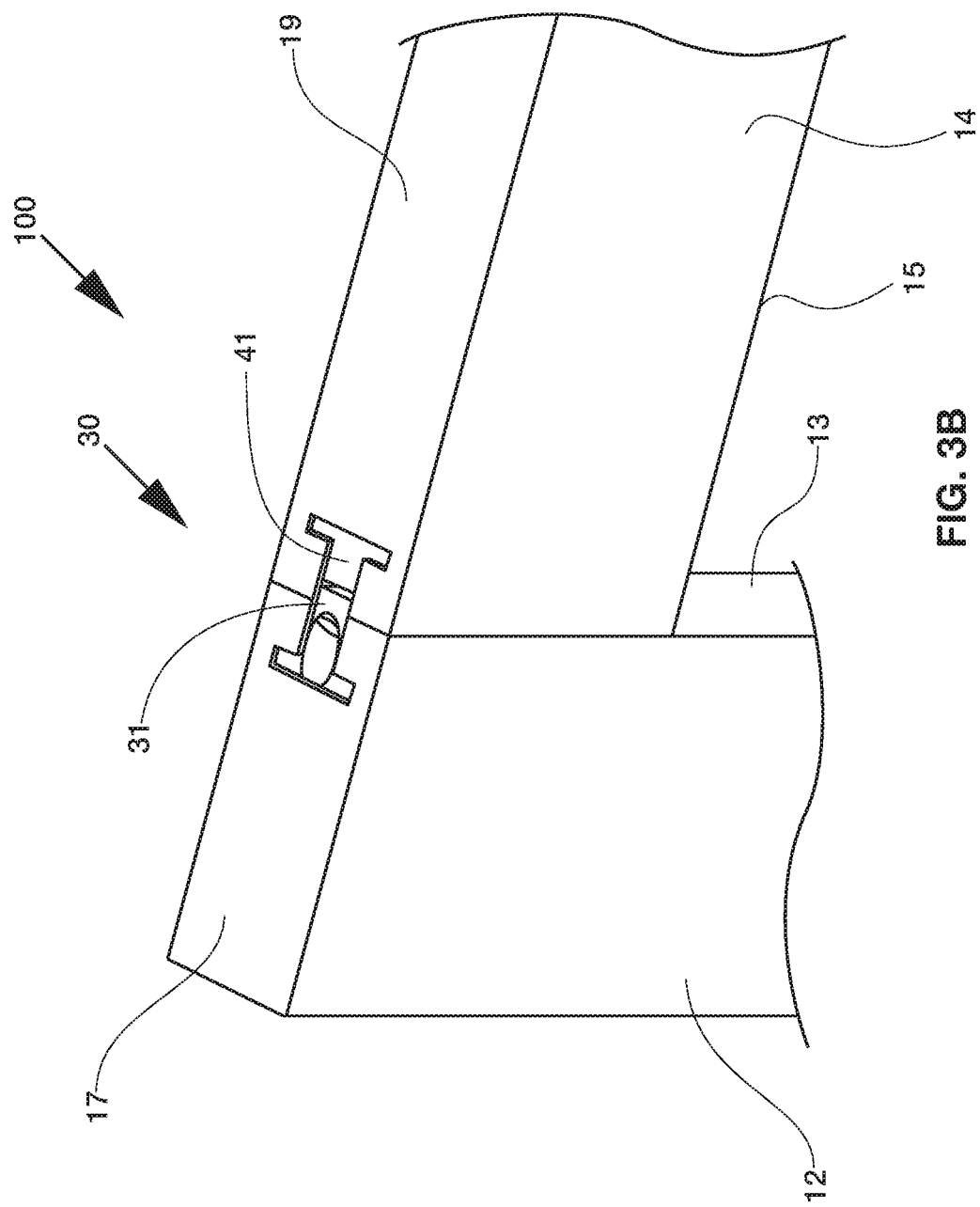
FIG. 3B is a top perspective view of one example of the connector for a door rail and stile assembly of FIG. 3A.
Figure 3C:
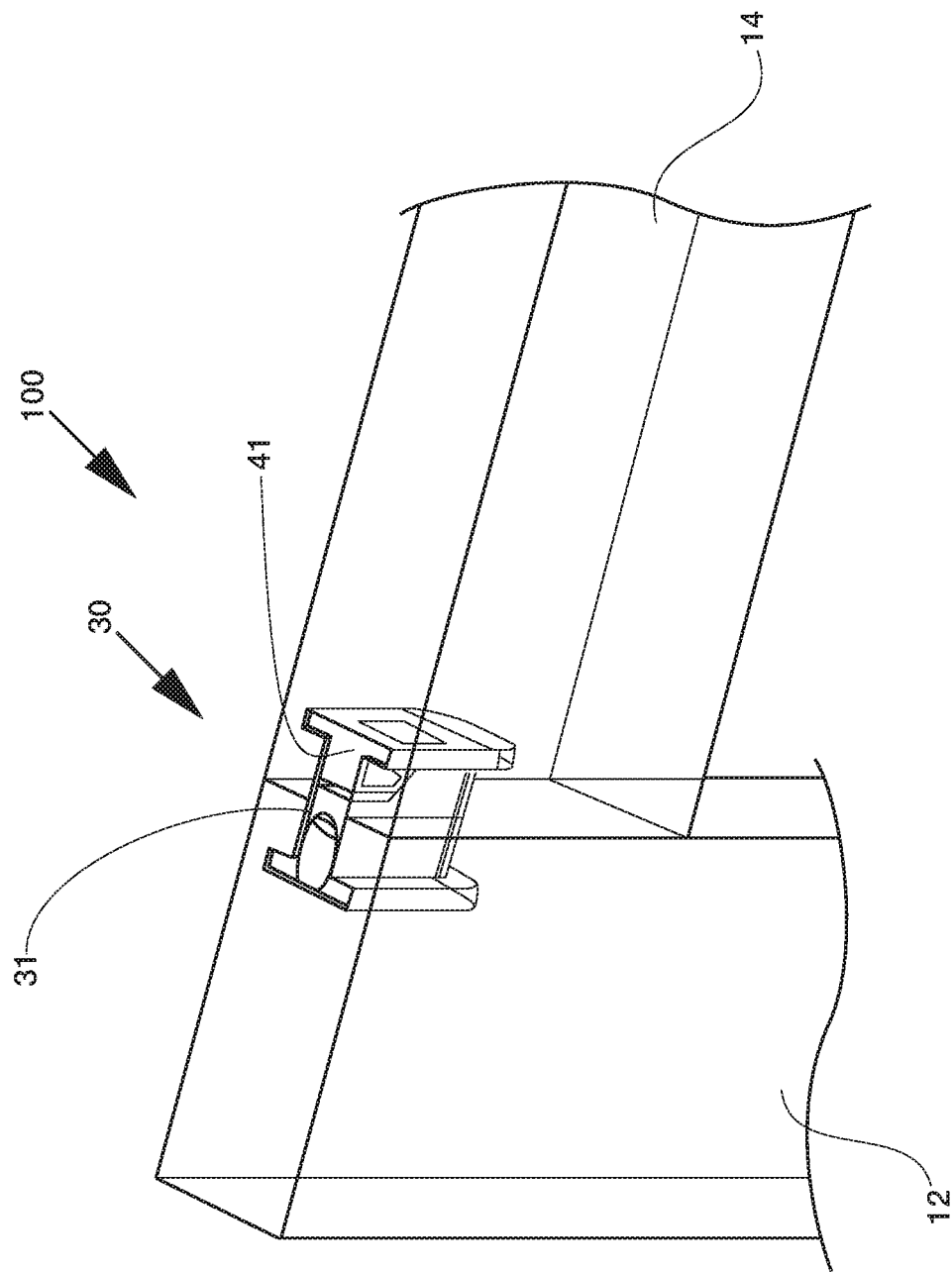
FIG. 3C shows a top perspective view with a cut away showing one example of the connector for a door rail and stile assembly of FIG. 3B.
Figure 3D:
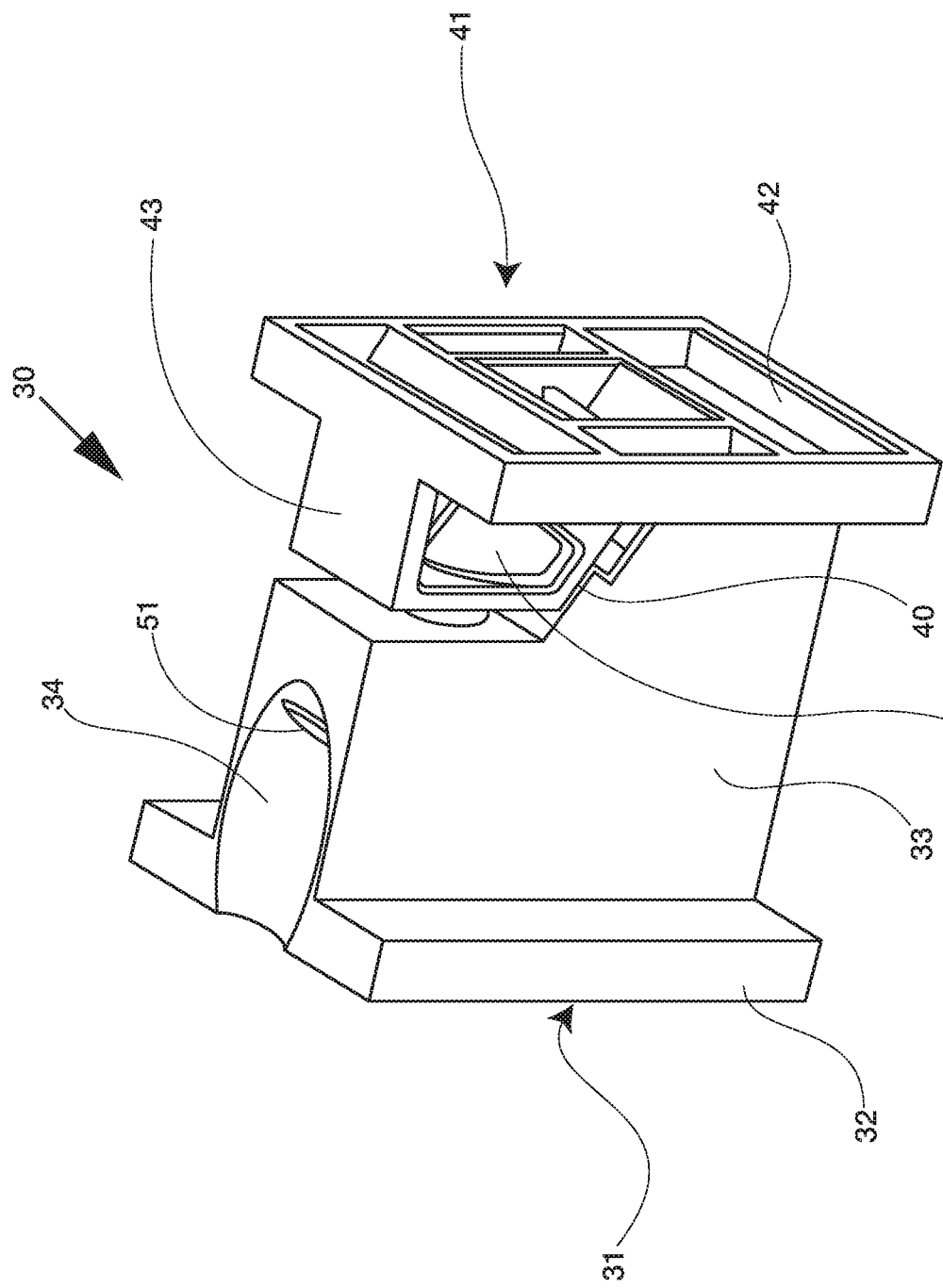
FIG. 3D shows a front perspective view of one example of a connector for a door rail and stile assembly for a door panel constructed according to FIG. 3C.
Figure 3E:
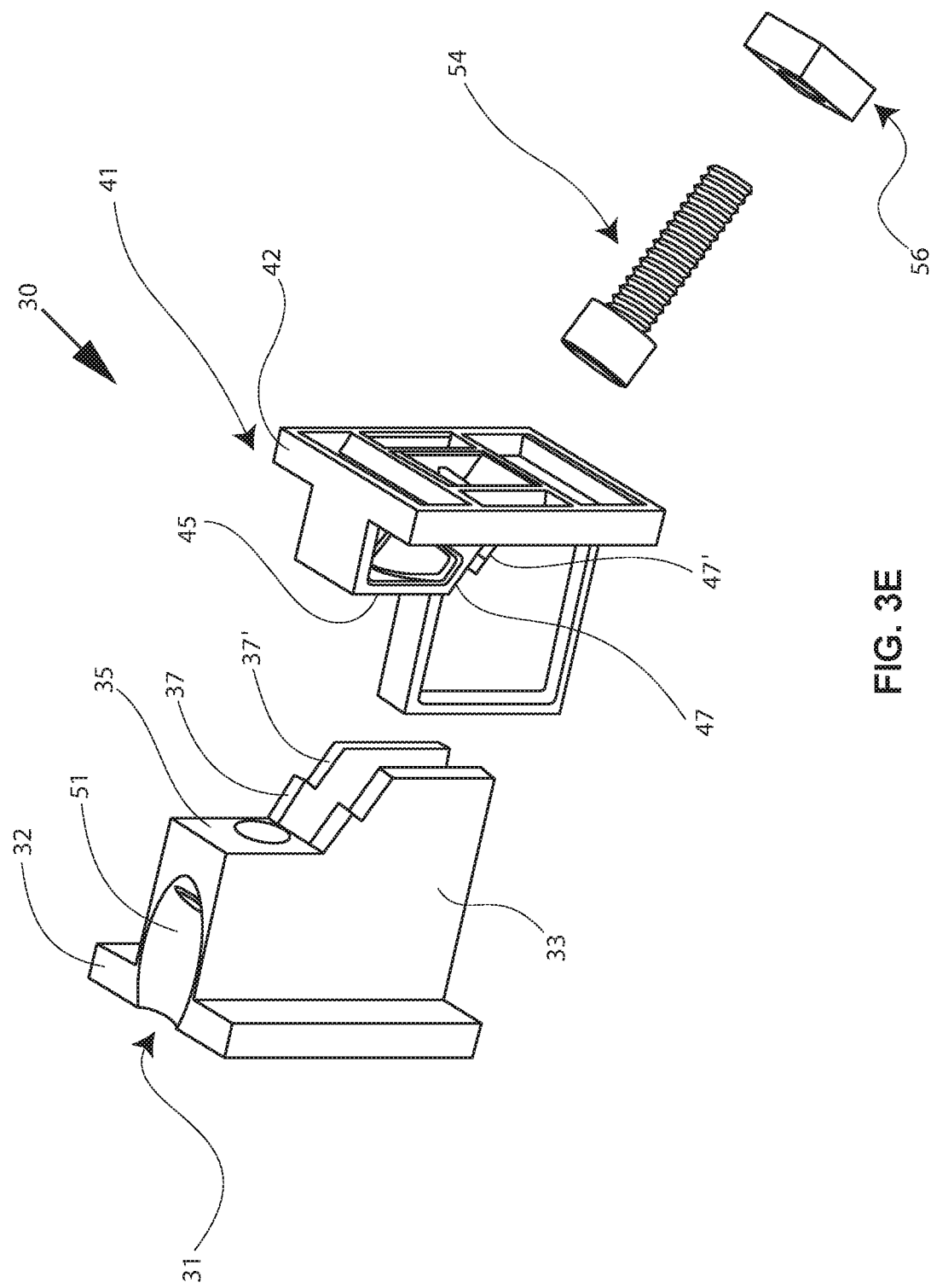
FIG. 3E is an exploded view of the connector for a door rail and stile assembly of FIG. 3D.
Figure 4A:
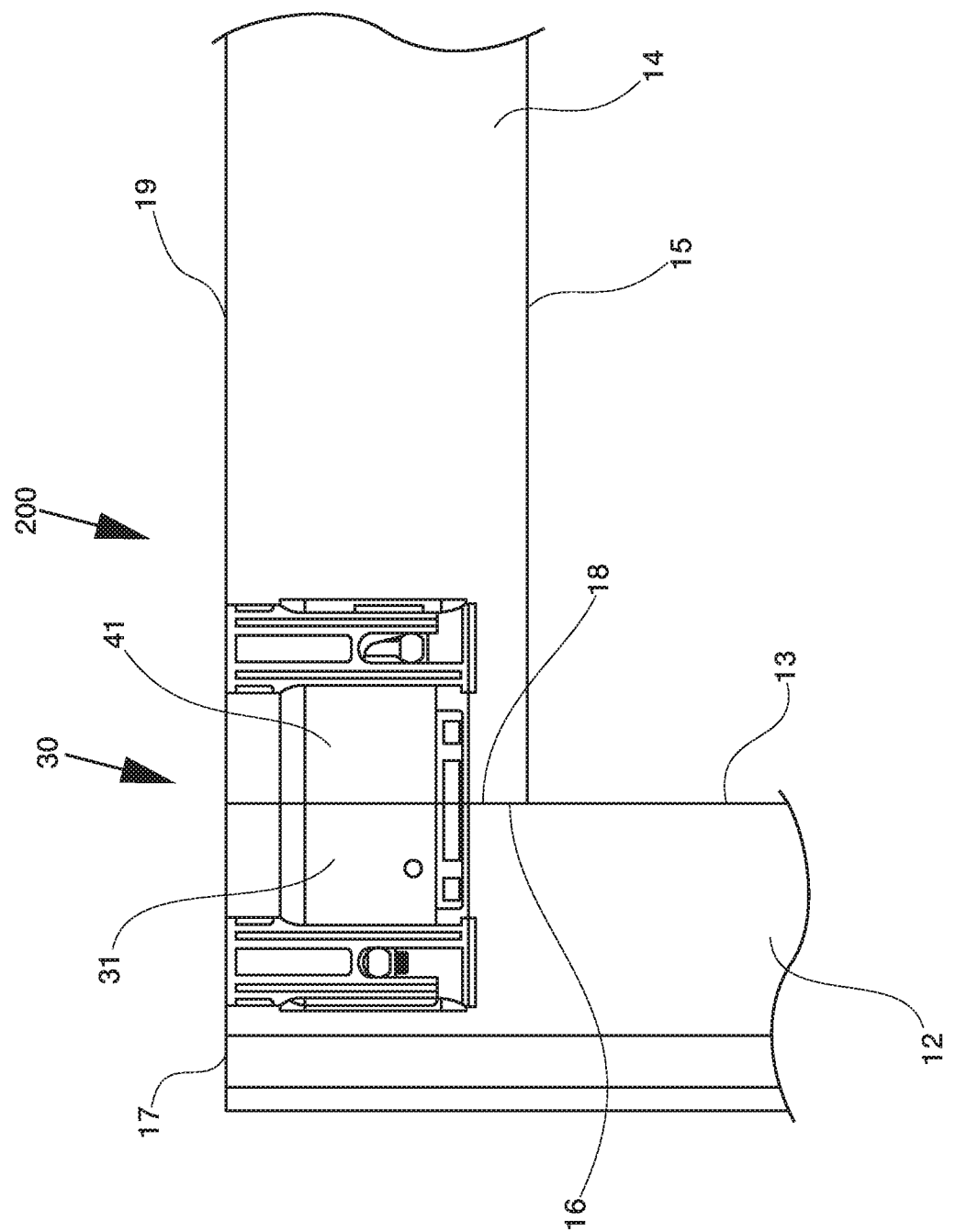
FIG. 4A is a front view with a cut away of one embodiment of a connector for a door rail and stile assembly constructed according to the present disclosure.
Figure 4B:
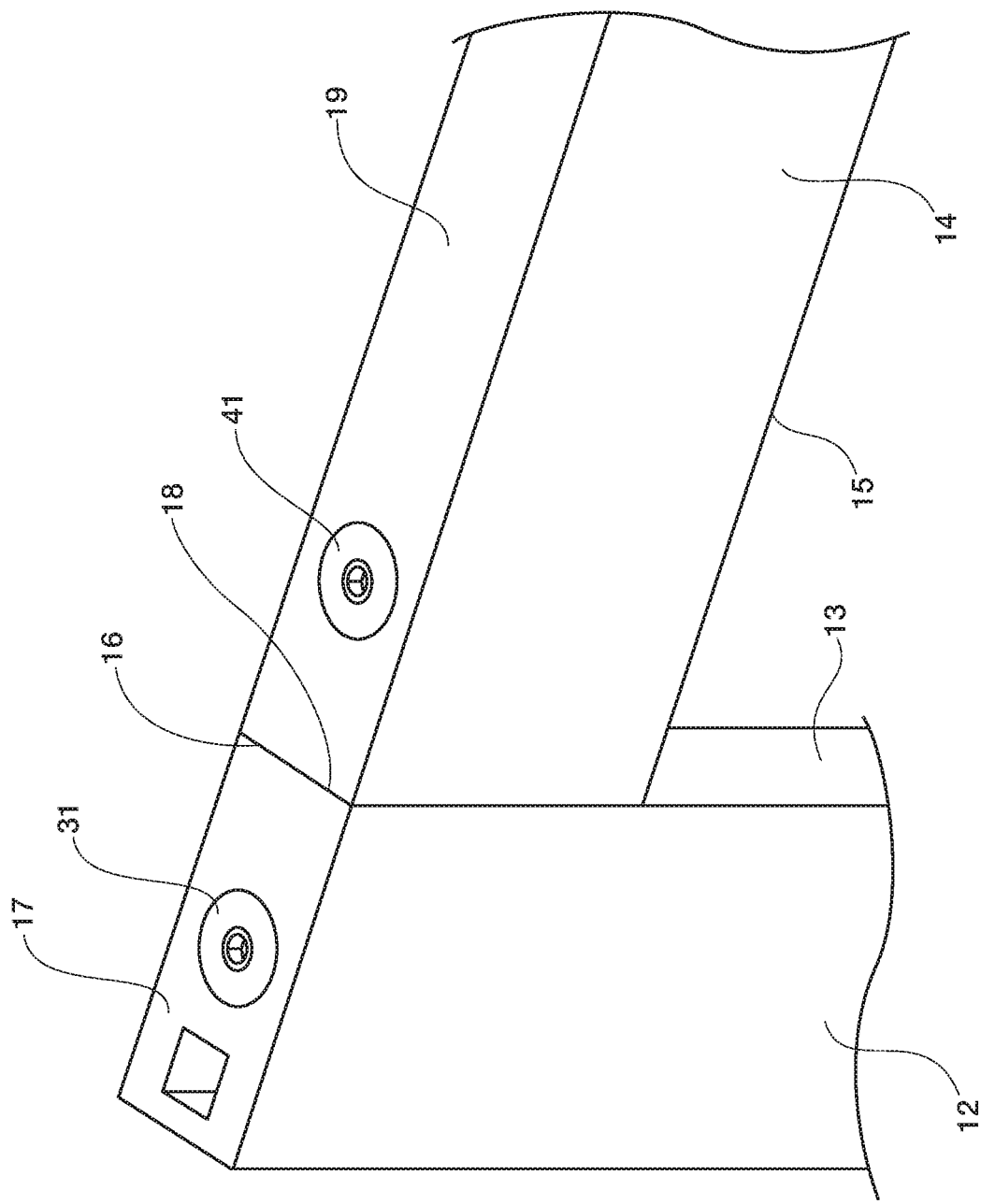
FIG. 4B is a top perspective view of one embodiment of the connector for a door rail and stile assembly of FIG. 4A.
Figure 4C:
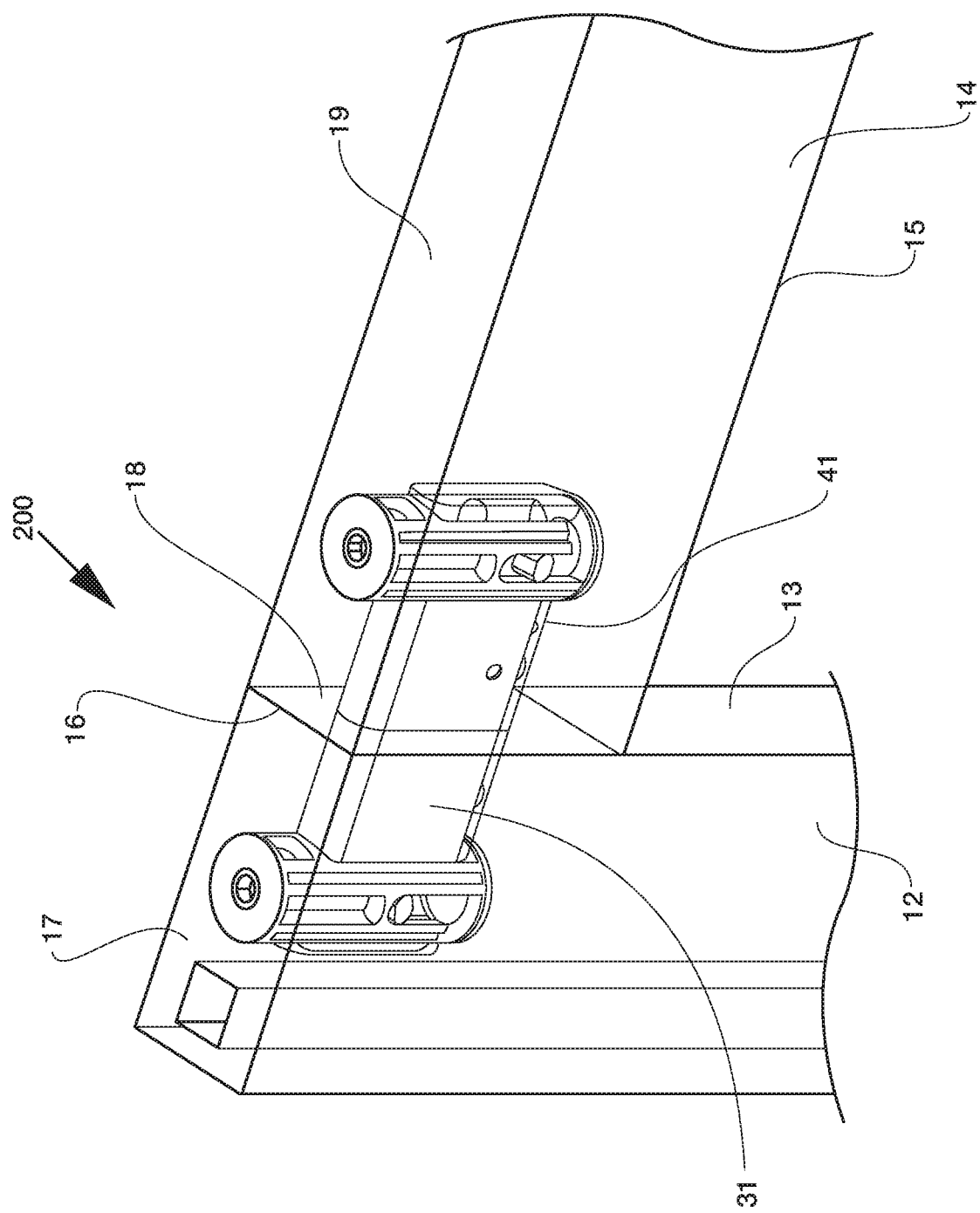
FIG. 4C is a top perspective view with a cut away showing one example of the connector for a door rail and stile assembly of FIG. 4B.
Figure 4D:
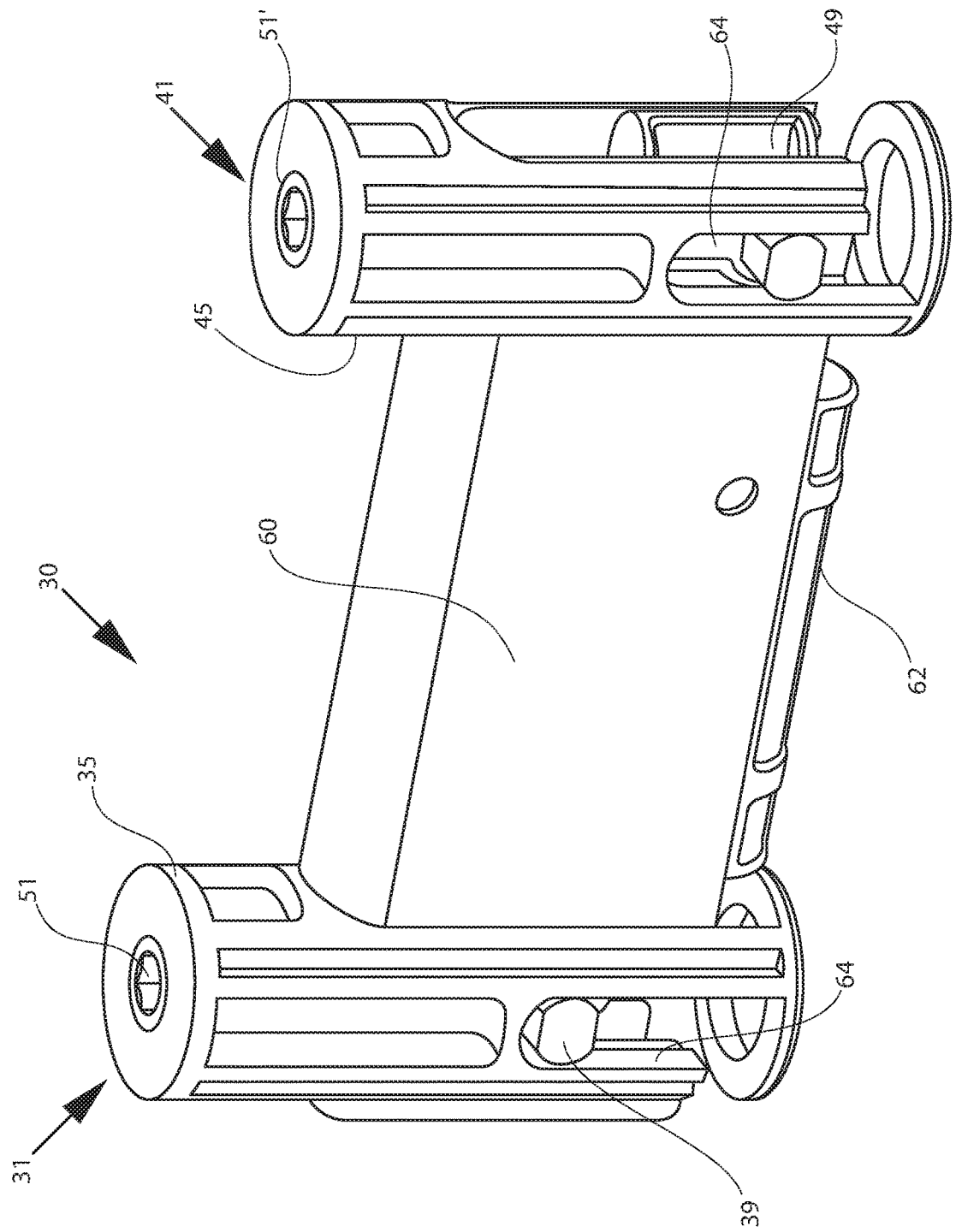
FIG. 4D shows a front perspective view of one example of the connector as shown in FIG. 4C.
Figure 4E:
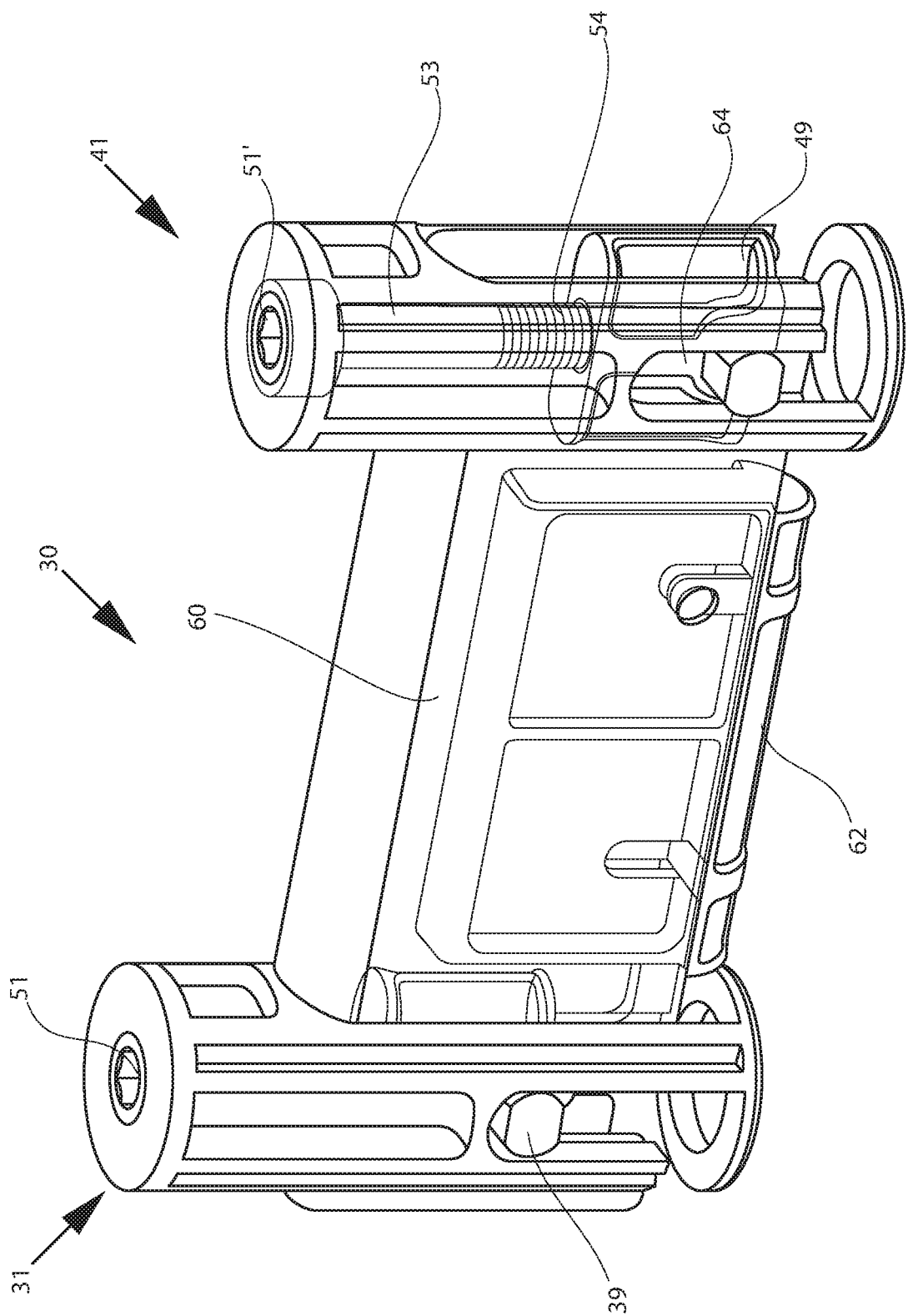
FIG. 4E shows a front perspective cut away view of the connector of FIG. 4D.
Figure 4F:
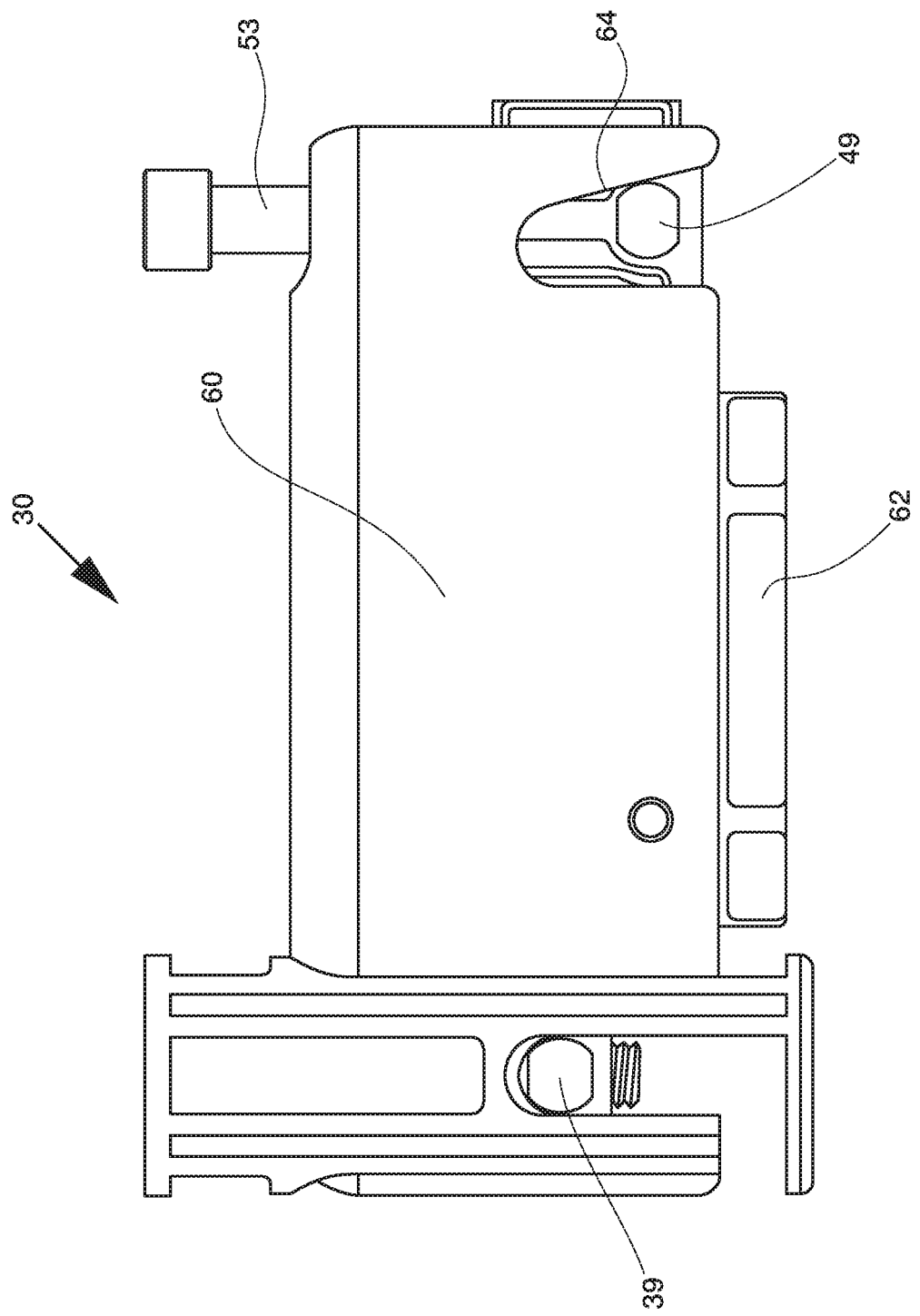
FIG. 4F shows a front view of the connector as shown in FIG. 4D.
Figure 4G:
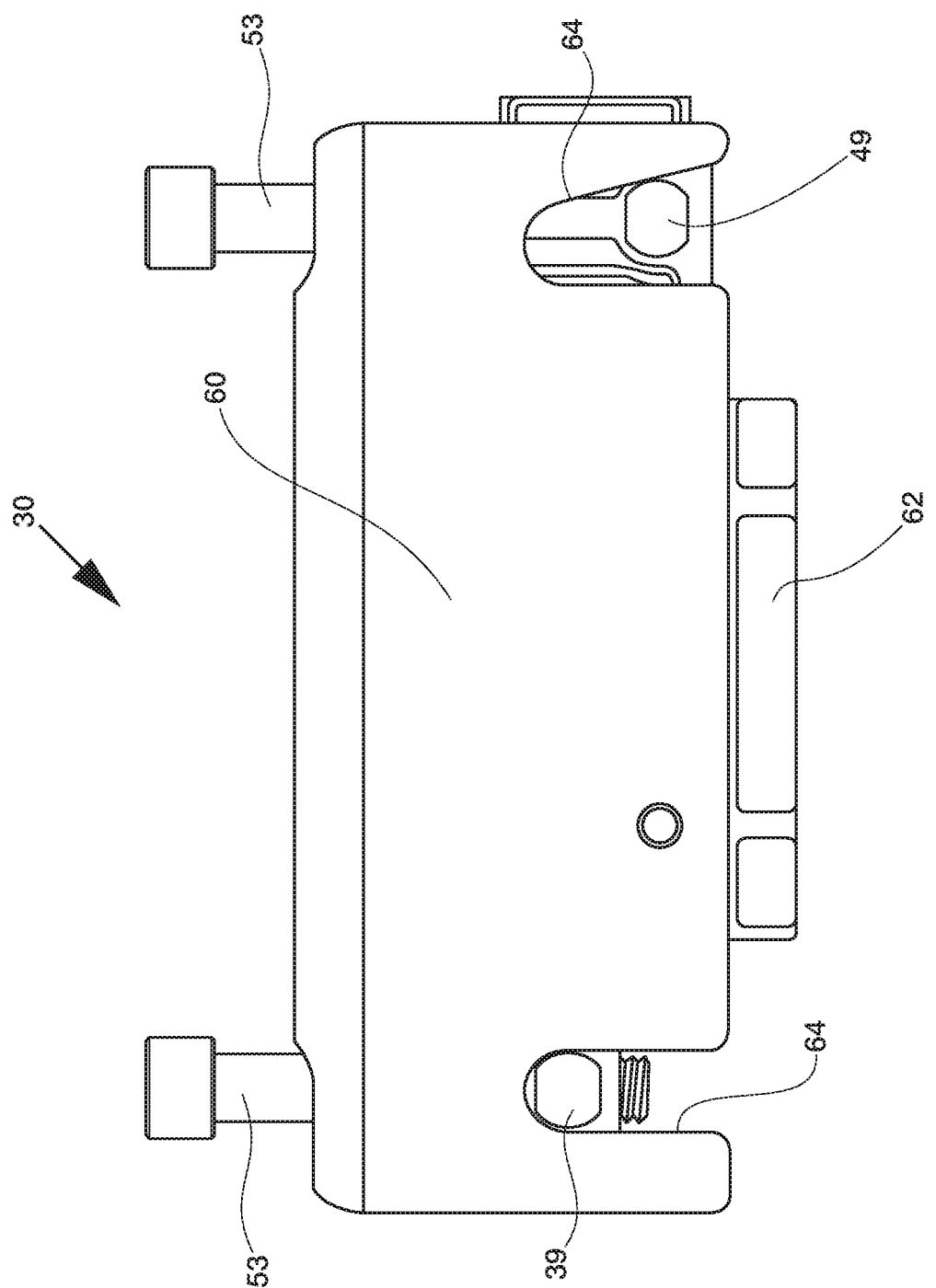
FIG. 4G shows an alternative font perspective cut away view of the connector as shown in FIG. 4D.
Figure 4H:
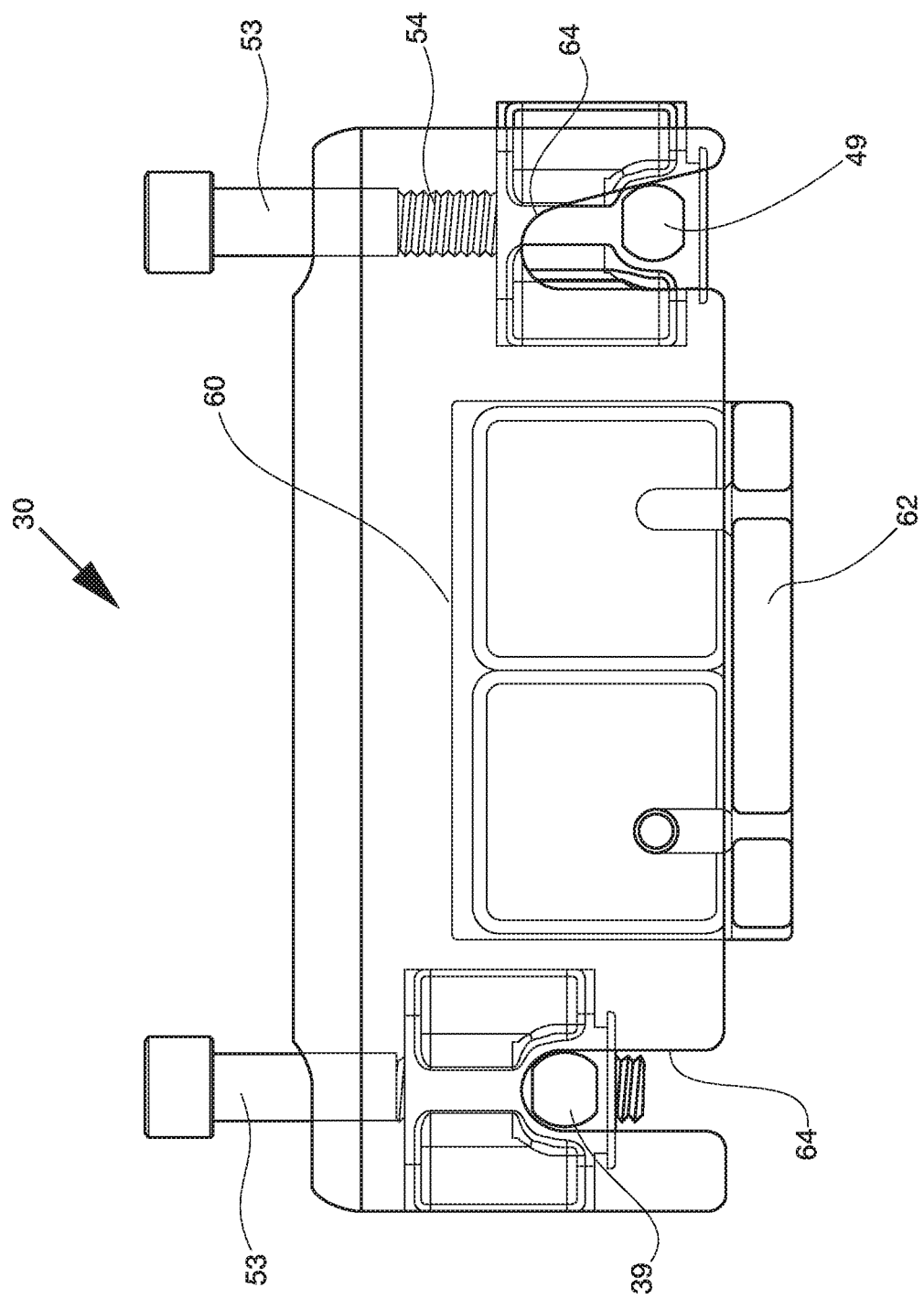
FIG. 4H shows an alternative front perspective cut away view of the connector as shown in FIG. 4D.

FIGS. 1 through 2E show one embodiment where the stile member 12 may include a stile top 17, an inner stile 13, and a stile mating surface 16. The rail member 14 may include a rail top 19, an inner rail 15 and a rail mating surface 18.

As shown in FIG. 2A, door rail and stile assembly 10 for a door panel, may also include a stile and rail connector 30. Rail connector 30 may, in some examples include a stile connector portion 31 and a rail connector portion 41. The rail connector portions 31, 41 may be embedded within the stile member 12 and rail member 14, respectively. In some examples, the stile connector portion 31 may project into the rail member 14. The rail connector portion 41 may project into the stile member 12. The stile connector member 31 and the rail connector member 41 may interface to form a connector adjustment face 40 (see FIG. 2C), the connector adjustment face configured to allow an adjustment between the stile member and the rail member by way of the connector 30.

The connector 30 may be a mechanical connector for joining stiles and rails. The connector 30 may incorporate attachments, by way of example serving as securing mechanisms, in one example, adjustment screws. The connector 30 may be made of a durable material, by way of example, metal, plastic, etc., and/or combinations thereof. The stile member 12 and the rail member 14 may include connector 30 profiles machined internally in the stile member and rail member.

FIGS. 2C and 2D show connector 30 in examples including a stile interlock 32 and a rail interlock 42. Stile interlock 32 and rail interlock 42 may include extended arms that project outward from the body 33 of the stile connector member 31 and the body 43 of the rail connector member 41, forming securing mechanisms for the connector ends within the door panel frame. Stile body 33 and rail body 43 may meet to form the connector adjustment face 40, securing flush the stile mating surface 16 and the rail mating surface 18. Adjustment face 40 may, in some examples, be a tapered face, a stepped face, a sliding face, and/or a combination thereof.

FIGS. 2D-2E show connector 30 in partially exploded and cut away views. Stile connector portion 31 may include a recess 34. Recess 34 may include an orifice 51 and extend to a securing extension 53. Securing extension 53 may be a projection extending from the recess 34 into the rail connector portion 41. The securing extension 53 may include a diagonal extended part. Securing extension 53 may accept an anchor 54, by way of example, an anchoring screw.

The anchor may be seated into a securing base 56, in one example, an anchoring nut.

A stile first face 35 may mate with a rail first face 45. A stile second face 37 may meet with a rail second face 47. The stile first face 35 may extend in a substantially vertical plane, while the stile second face 37 may extend in a non-parallel plane, by way of example, in a diagonal plane, away from the first face.

The anchor 54 may be received by the securing extension 53 and may be adjusted to slide the stile connector portion 31 as to the rail connector portion 41 along the adjustment face 40.

FIGS. 3A-3E show an alternate embodiment of a door rail and stile assembly 100 for a door panel. Assembly 100 may include many or all of the embodiments as previously described. In this example, stile second face 37 may extend in a non-parallel manner from stile first face 35.

Stile second face 37, 37' may stair-step down from stile first face 35. The rail first and second face 45, 47, 47' may be structured to mate with stile first and second faces 35, 37, 37'.

FIGS. 4A-4H show yet another embodiment for a door rail and stile assembly 200 for a door panel. The connector 30 of assembly 200 may include the recess 51 and a second recess 51'. The recess 51, 51' may be substantially vertically aligned. The recess 51, 51' may form a securing extension 53, which accepts an anchor 54. The stile connector portion 31 may include a slide 39. The rail connector portion 41 may include a slide 49. A clamp 60 may extend between the slide 39 and slide 49. The clamp 60 may house the slide 39, 49 within the rail connector portion 41 and the stile connector portion 31. The clamp 60 may cover a clamp spacer 62.

An anchor in the stile connector portion 31 and/or in rail connector portion 41, allows independent adjustment at each portion individually, or at both portions collectively. Thus, adjustment of the connector 30, allows, in this example, adjustment of the stile member 12 as to the rail member 14. The stile connector portion 31 and/or the rail connector portion 41 may include an adjustment space 64. The adjustment space, in some examples, may take on any suitable, variable shape. In some embodiments, the adjustment space 64 may include an angled, tapered edge for guiding, encouraging an adjustment of the slide 39, 49 within the respective portion 31, 41 by way of the anchor 54.

The invention may also be considered a connector for a door panel. The inventions of the present disclosure also are considered to include a method for securing a door panel joint by way of any of the embodiments disclosed herein.

Certain modifications and improvements will occur to those skilled in the art upon a reading of the foregoing description. It should be understood that all such modifications and improvements have been deleted herein for the sake of conciseness and readability but are properly within the scope of the following claims.

I claim:

1. A door rail and stile assembly for a door panel, comprising:
a door stile member for a door panel,
a door rail member for a door panel,
a joint formed by the stile member and the rail member along a stile mating surface and a rail mating surface, and
an adjustable connector having a rail connector portion and a stile connector portion,
   the rail connector portion including a vertical slide, and
   the stile connector portion including a vertical slide, the vertical slides adjusting by way of an anchor included in each portion.

2. The assembly of claim 1, wherein a connector body is embedded within the stile member and the rail member.

3. The assembly of claim 1, wherein the stile connector portion extends into the rail member and the rail connector portion extends into the stile member.

4. The assembly of claim 1 wherein the stile connector portion and the rail connector portion interface to form a connector adjustment face.

5. The assembly of claim 4, including a stile interlock.

6. The assembly of claim 4 including a rail interlock.

7. The assembly of claim 4 including a stile connector projection.

8. The assembly of claim 4 wherein the connector adjustment face is a tapered surface.

9. The assembly of claim 1, including a pair of securing extensions, the first securing extension positioned in the stile connector portion and the second securing extension positioned in the rail connector portion.

10. The assembly of claim 9 wherein the e slide within the stile connector portion and the slide within the rail connector portion are vertically adjustable.

11. The assembly of claim 10 including a clamp extending between the stile connector portion and the slide connector portion.

12. The assembly of claim 11 wherein said clamp forms a bridge between the slides.

13. The assembly of claim 12 wherein the clamp is adapted to provide an adjustment between the stile connector portion and the rail connector portion.

14. The assembly of claim 13 including an adjustment space.

15. The assembly of claim 14 wherein the adjustment space includes an angled tapered edge.

16. A connector for a door panel door having a rail and stile connector assembly, comprising:
a door panel having a stile member and a rail member, the door stile member and the door rail member forming a joint along a stile mating surface and a rail mating surface, and
an adjustable connector having a rail connector portion and a stile connector portion, the adjustable connector at least partially embedded in the stile member and in the rail member,
wherein the stile member and the rail member interface to form a connector adjustment face, the adjustment face allowing an adjustment between the stile member and the rail member,
the stile member including a vertical slide, and the rail member including a vertical slide, both slides being adjustable by way of an anchor situated vertically within each member.

\* \* \* \* \*